United States Patent
Bakke et al.

(10) Patent No.: US 6,728,818 B2
(45) Date of Patent: Apr. 27, 2004

(54) DUAL STORAGE ADAPTERS UTILIZING CLUSTERED ADAPTERS SUPPORTING FAST WRITE CACHES

(75) Inventors: Brian Eric Bakke, Rochester, MN (US); Robert Edward Galbraith, Rochester, MN (US); Frederic Lawrence Huss, Rochester, MN (US); Daniel Frank Moertl, Rochester, MN (US); Paul Gary Reuland, Rochester, MN (US); Timothy Jerry Schimke, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 477 days.

(21) Appl. No.: 09/894,428

(22) Filed: Jun. 27, 2001

(65) Prior Publication Data

US 2003/0005202 A1 Jan. 2, 2003

(51) Int. Cl.$^7$ .......................... G06F 13/10; G06F 12/16
(52) U.S. Cl. .......................... 710/305; 710/52; 710/72; 711/141; 711/112; 711/118
(58) Field of Search .......................... 710/305, 52, 300, 710/2, 260, 62, 72; 711/141, 142, 112, 118, 162; 714/6; 707/204; 709/238; 712/5

(56) References Cited

U.S. PATENT DOCUMENTS

| | | | |
|---|---|---|---|
| 4,530,052 A | * 7/1985 | King et al. | 713/100 |
| 5,463,736 A | * 10/1995 | Elko et al. | 710/28 |
| 5,765,195 A | * 6/1998 | McDonald | 711/141 |
| 6,434,681 B1 | * 8/2002 | Armangau | 711/162 |
| 6,530,003 B2 | * 3/2003 | Bakke et al. | 711/162 |

OTHER PUBLICATIONS

"Design and analysis of cache coherent multistage interconnection networks" by A. K. Nanda and L. N. Bhuyan. (abstract only).*

* cited by examiner

*Primary Examiner*—Gopal C. Ray
(74) *Attorney, Agent, or Firm*—Bracewell & Patterson LLP

(57) ABSTRACT

An Input/Output (I/O) adapter for use with a second I/O adapter in a clustered configuration. The I/O adapter includes a dedicated communication link, such as a high-speed serial bus, that provides for communication between the I/O adapter and the second I/O adapter. The I/O adapter also includes a message passing circuit, coupled to the dedicated communication link, that allows for transferring of data between the I/O adapter and the second I/O adapter. The I/O adapter further includes a doorbell circuit, coupled to the message passing circuit, that generates interrupts to provide a low level communication between the I/O adapter and the second I/O adapter. A mirroring directory, coupled to the message passing circuit, is also included in the I/O adapter to provide for the mirroring of cache directory writes.

24 Claims, 5 Drawing Sheets

DUAL STORAGE ADAPTERS UTILIZING CLUSTERED ADAPTERS SUPPORTING FAST WRITE CACHES

BACKGROUND OF THE INVENTION

1. Technical Field

The present invention relates in general to input/output (I/O) devices and, in particular, to I/O storage adapters. More particularly, the present invention relates to a dual storage adapter that utilizes I/O adapters that mirror write cache data and cache directory between them.

2. Description of the Related Art

Business use of computer systems has increased dramatically over the last half century. The use of the computer has also evolved and in today's business environment, more and more customers are becoming critically dependent on their information technology resources. As a result, they demand that these resources are always available. Any outage affecting their information technology resources has serious business implications including lost revenue and lost business. At the extreme, an extended system outage can cause a business to be permanently closed. Furthermore, the cost of one hour of system downtime can range from tens of thousands of dollars to several million dollars, depending on the nature of the business. Therefore, users require that their system services be continuously available, that is that the services be available 24 hours a day, 365 days a year. Technology that supports increased computer system availability has become critical to many businesses.

A key technology that enables systems to provide continuous availability is clustering. A cluster is a collection of one or more complete systems that operate together to provide a single, unified computing capability. The perspective from the end user is that the cluster operates as though it were a single system. Work can be distributed across multiple systems in the cluster and any single outage, planned or unplanned, in the cluster will not disrupt the services provided to the end user. The end user services can be relocated from system to system within the cluster in a relatively transparent fashion.

For computer systems, reliability is a measure of unexpected failures and availability is a measure of system downtime; the lower the downtime, the higher the availability. One can draw a relationship between reliability and availability, of course, because unexpected software and hardware failures are one cause of downtime. Thus, with all other factors being equal, a system with high reliability will also have high availability. To achieve continuous availability, more than just robust system availability is needed. Critical data and critical applications must also be resilient to outages and both must be accessible across the cluster even when the normal hosting system for the resource fails. A complete solution is achieved when the critical data and the critical applications are made to be resilient resources and are always available. Data resilience ensures that a copy of the data is always accessible to end users of the cluster while application resilience ensures that the services provided by the application are always accessible to end users of the cluster.

Input/output (I/O) storage adapters are interfaces between a computing system and a storage subsystem. In a high availability configuration, such as a cluster, redundant adapters are utilized to provide the necessary reliability, in the event that when a primary adapter fails, the backup adapter can takeover ensuring continued operation. When employing storage adapters that have resident write caches, the write cache data and directory information must be kept in synch, i.e., the cache data and directory information in the primary and backup adapters must mirror each other, to ensure a "flawless" takeover in the event of a failure in the primary adapter to maintain data resiliency.

Accordingly, what is needed in the art is a storage adapter with a resident write cache that can be clustered with another storage adapter with a resident write cache and still be ensured of data resiliency.

SUMMARY OF THE INVENTION

It is therefore an object of the invention to provide an improved data processing system.

It is another object of the invention to provide a clustered dual storage adapter employing storage adapters that have resident write caches.

To achieve the foregoing objects, and in accordance with the invention as embodied and broadly described herein, an Input/Output (I/O) adapter for use with a second I/O adapter in a clustered configuration is disclosed. The I/O adapter includes a dedicated communication link that, in an advantageous embodiment, is a high-speed serial bus. The communication link provides for communication between the I/O adapter and the second I/O adapter. The I/O adapter also includes a message passing circuit, coupled to the dedicated communication link, that allows for transferring of data between the I/O adapter and the second I/O adapter. The message passing circuit, in an advantageous embodiment, includes a transmit buffer, a receive buffer, a transmit register that initiates the transfer of data stored in the transmit buffer to the second I/O adapter and a receive register that indicates the receipt of data from the second I/O adapter. The I/O adapter further includes a doorbell circuit, coupled to the message passing circuit, that generates interrupts to provide a low level communication between the I/O adapter and the second I/O adapter. The doorbell circuit includes, in an advantageous embodiment, a transmit doorbell register that permits the I/O adapter to set bits in the second I/O adapter's corresponding receive doorbell register, a receive doorbell register and a mask doorbell register that allows for the masking of incoming receive doorbell interrupts. A mirroring directory, coupled to the message passing circuit, is also included in the I/O adapter to provide for the mirroring of cache directory writes. In a related embodiment, both the transferring of data and the performing of a write operation by the message passing circuit between the I/O adapter and the second I/O adapter is a write operation with no required acknowledgment from the second I/O adapter.

The present invention discloses a novel hardware assisted mechanism for mirroring required data and directory information between two clustered storage adapters that support fast write cache utilizing a dedicated, independent physical hardware communication link. The present invention allows the utilization of a synchronous firmware model instead of an asynchronous model to accomplish write cache directory updates. Thus, the implemented firmware does not need to wait for an update to cache directory to complete. The direct memory access (DMA) firmware setup for each write operation is almost identical to the firmware setup for a non-clustered write operation with a minimal delay added to each host write operation when compared to a non-clustered storage adapters configuration. Furthermore, the data protection mechanisms provided by the present invention prevent the firmware in the failed adapter from inadvertently corrupting data in either its own adapter or the backup data.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
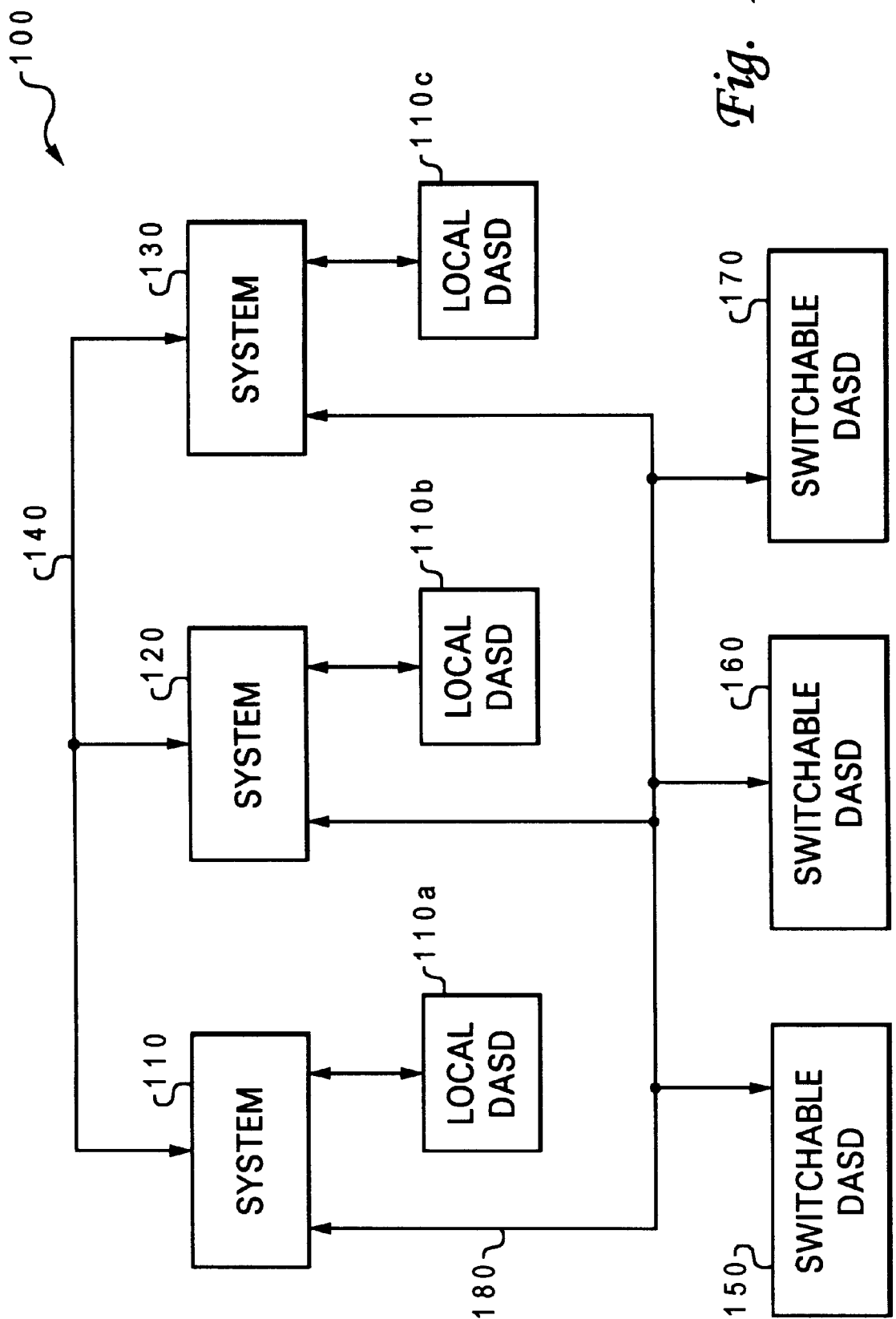
FIG. 1 illustrates an exemplary data processing system that provides a suitable environment for the practice of the present invention.

With reference now to the figures and in particular with reference to FIG. 1, there is depicted an exemplary data processing system 100 that provides a suitable environment for the practice of the present invention. Data processing system 100 includes first, second and third systems (processing units) 110, 120, 130, such as conventional personal computers or workstations, that are coupled together utilizing a system interconnection 140 that provides a means for communication between the systems. Interconnection 140 may be any one of several conventional network connection topologies, such as Ethernet. Also depicted in the illustrative embodiment are first, second and third local data storage devices 110a, 10b, 110c, e.g., conventional hard disk drives, each of which is associated with a corresponding processing unit. First, second and third systems 110, 120, 130 are also coupled via an input/output (I/O) interconnect 180, such as Fibre Channel, to a plurality of switchable direct access storage devices (DASDs), generally designated first, second and third switchable DASDs 150, 160, 170. It should be noted that each of the switchable DASDs may be, in an advantageous embodiment, a redundant array of independent disks (RAID) storage subsystem or, alternatively, a single storage device. In a preferred embodiment, data processing system 100 utilizes a clustering configuration and the switchable DASDs allows data processing system 100 to incur a primary system, e.g., first system 110, failure and still be able to continue running on a backup system, e.g., second system 120, without having to replicate or duplicate DASD data during normal run-time. The switchable DASD is automatically switched, i.e., no movement of cables required, from the failed system to the backup system as part of an automatic or manual failover.

Figure 2:
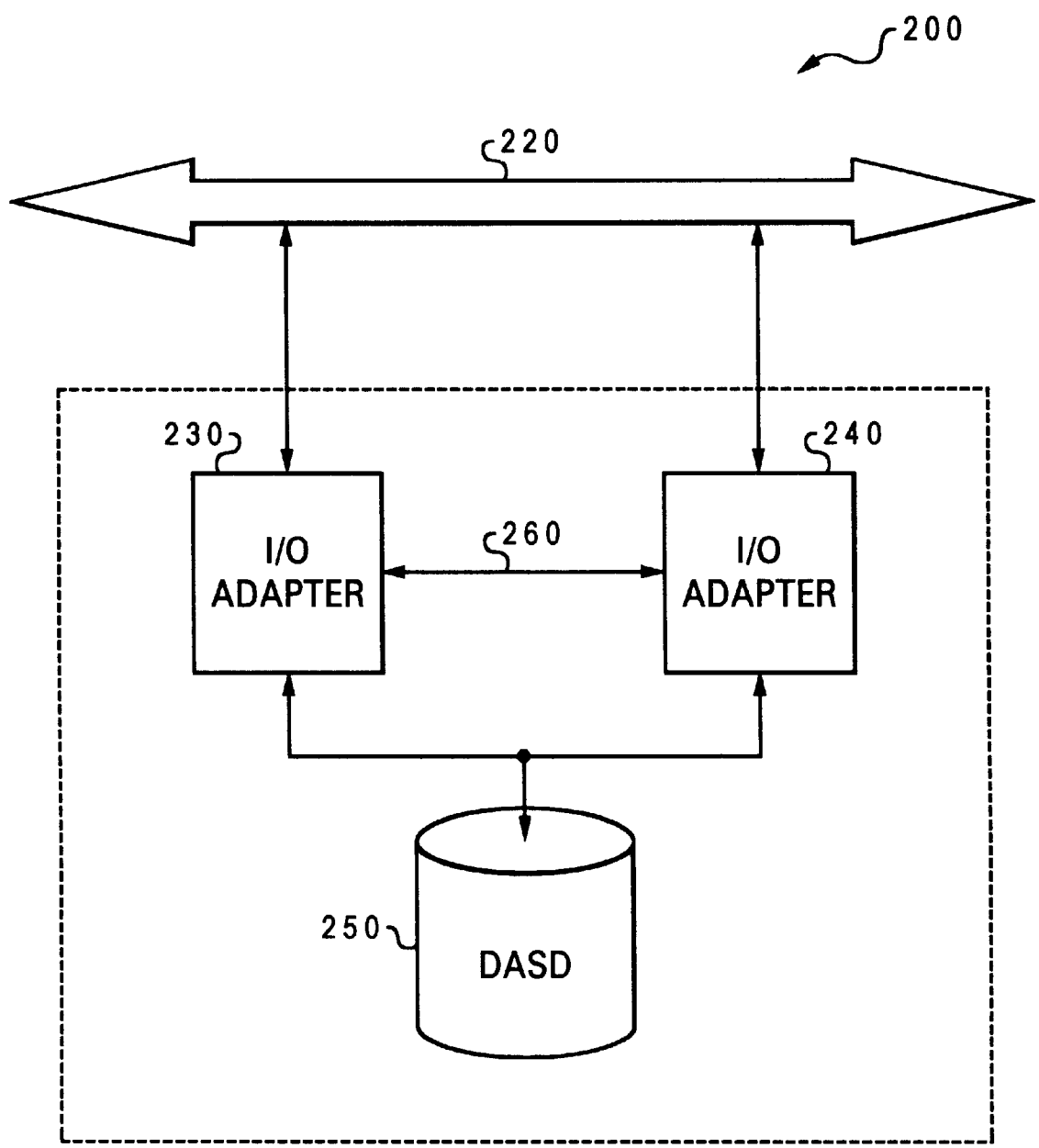
FIG. 2 illustrates a simplified block diagram of an exemplary switchable DASD utilizing an embodiment of a dual storage adapter according to the principles disclosed by the present invention.

Referring now to FIG. 2, there is illustrated a simplified block diagram of an exemplary switchable DASD 200 utilizing an embodiment of a dual storage adapter according to the principles disclosed by the present invention. In the illustrated embodiment, switchable DASD 200 (analogous to first, second or third switchable DASDs 150, 160, 170 in FIG. 1) is shown coupled to an I/O interconnect 220 (analogous to I/O interconnect 180 in FIG. 1). Switchable DASD 200 includes a dual storage adapter having first and second I/O adapters 230, 240 coupled to a storage device 250 that, as discussed above, may be a single storage device or a number of storage devices in a RAID configuration. A dedicated communication link 260, such as a high-speed serial bus, is utilized to provide a means of communication between first and second I/O adapters 230, 240. The operation and construction of an I/O adapter that may be advantageously utilized for first and second I/O adapters 230, 240 will be described in greater detail hereinafter in conjunction with FIG. 3, with continuing reference to FIGS. 1 and 2.

Figure 3:
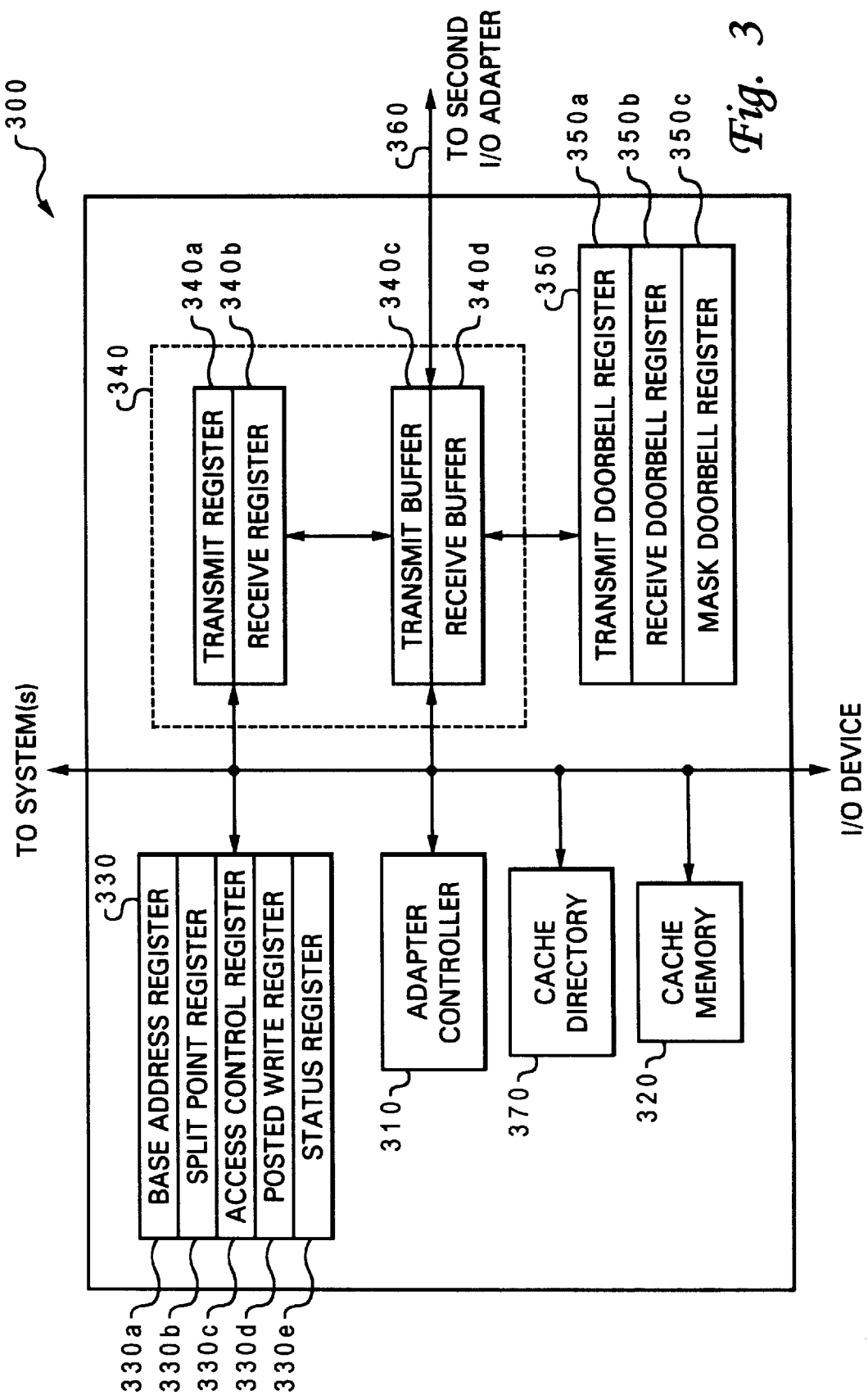
FIG. 3 illustrates a block diagram of an embodiment of an I/O adapter according to the present invention.

Turning now to FIG. 3, there is depicted a block diagram of an embodiment of an I/O adapter 300 according to the present invention. I/O adapter 300 includes an adapter controller 310 that provides the local processing functions coupled to a cache memory 320 and a cache directory 370. A dedicated hardware communication link 360 that, in an advantageous embodiment, is a high-speed serial bus, couples I/O adapter 300 to a second I/O adapter (not shown) in a dual storage adapter configuration (analogous to first and second I/O adapters 230, 240 depicted in FIG. 2). Communication link 360 is utilized to keep the fast write cache directory information in cache directory 370 and data in cache memory 320 mirrored between I/O adapter 300 and a corresponding cache directory and cache memory in the second I/O adapter. Communication link 360 is coupled to a message passing circuit 340 that provides I/O adapter 300 the ability to sent and receive data from the second adapter and the means for determining if a message being read at a receiving end has been overlaid with a new incoming message. It should be noted that hardware acknowledgment of the successful transmission of the message is not required, essentially a "send and forget" operation. In the event that the data gets "corrupted" during transmission, the receiving adapter will simply discard the data. A higher-level firmware protocol utilized in I/O adapter 300, for example, may utilize a time-out mechanism to determine if retransmission is required. In the case of a cache data write or a cache directory write from I/O adapter 300 to the second adapter, a pass/fail acknowledgment is required. This acknowledgment is important because the second adapter sends the acknowledgment without invoking or interrupting the firmware running on the second adapter. This communication traffic, i.e., writing a mirror copy of the data and directory to the second adapter, that makes up the majority of the traffic on communication link 360, does not require any firmware resources on the second adapter. This is a synchronized firmware model, since I/O adapter 300 is notified of the successful mirroring of the data in the second adapter. This results in a fast data transfer that requires no firmware support on the second adapter while keeping I/O adapter 300 informed of the success or failure of the mirroring operation, i.e., cache data and cache directory writes.

To accomplish its functional tasks, message passing circuit 340 includes transmit and receive registers 340a, 340b and transmit and receive buffers 340*c* and 340*d*. In a preferred embodiment, both transmit and receive buffers 340*c*, 340*d* are conventional 128 byte registers that are utilized to buffer an outgoing or an incoming message, respectively. Transmit register 340*a* is utilized to initiate the sending of a message stored in transmit buffer 340*c* across communication link 360 to the second adapter. A write to transmit register 340*a* to set a send bit will initiate the data transfer to the second adapter. The set send bit in transmit register 340*a* will be cleared when I/O adapter 300 believes that the data has been sent. It should be noted that the successful receipt of the transmitted data will not be provided to I/O adapter 300 from the second adapter. Receive register 340*b*, in an advantageous embodiment, includes a "dirty" bit and a "message received" bit. Following the receipt of the first byte of an incoming message from the second adapter at I/O adapter 300, the dirty bit will be set. After all of the 128 byte message has been successfully received from the second adapter, the dirty bit is cleared and the message received bit will be set in I/O adapter 300. The message receive bit may also be utilized to interrupt the adapter's firmware to indicate that a message has not been received. The dirty bit will not be reset and the message receive bit will not be set if the full message was not successfully received. In another advantageous embodiment, a mask register (not shown) may be utilized by the adapters to prevent incoming messages from generating an interrupt. An illustrative message passing sequence from I/O adapter 300 to the second adapter is as follows. Initially, the firmware in I/O adapter 300 checks the send bit in transmit register 340*a* to ensure that there are no messages currently being sent to the second adapter. If the send bit is not set, a 128 byte message is loaded into transmit buffer 340*c*, following which, the send bit in transmit register 340*a* is set. Subsequently, the 128 byte message is sent via communication link 360 to a receive buffer in the second adapter and the send bit in transmit register 340*a* is cleared. Following the receipt of the first byte, a dirty bit in a receive register in the second adapter is set. Upon receiving the full message, the second adapter sets a receive bit in it's receive register and concurrently, in the same clock cycle, clears the dirty bit in it's receive register. The second adapter then proceeds to clear a message receive bit in an interrupt register (not shown) and copies the message out of it's receive buffer. Finally, the second adapter checks the dirty bit and the message receive bit in it's receive register to ensure that the message being copied out of it's receive buffer was not overlaid with another incoming message. It should be noted that the hardware in the second adapter does not prevent a new message from I/O adapter 300 from overlaying an older message in the receive buffer. It is the responsibility of the implemented firmware in the adapters to control the rate at which it transmits messages to prevent messages from being lost. Any conventional suitable techniques that are well-known in the art may be advantageously employed.

A doorbell circuit 350 is utilized in I/O adapter 300 to provide a means for base low level communication between I/O adapter 300 and the second adapter, i.e., "mirrored" adapter, by supplying the ability to generate interrupts in the mirrored adapter. Doorbell circuit 350 includes a transmit doorbell register 350*a*, a receive doorbell register 350*b* and a mask doorbell register 350*c*. Transmit doorbell register 350*a* is utilized by I/O adapter 300 to set bits in the second adapter's receive doorbell register active by setting a corresponding bit in transmit doorbell register 350*a*. The bits in receive doorbell register 350*b* are set by the second adapter utilizing it's transmit doorbell register. It should be noted that both I/O adapter 300 and the second adapter can clear its own receive doorbell register. The bits in receive doorbell register 350*b* can be masked and any unmasked bits that are active can raise an interrupt. Mask doorbell register 350*c* is utilized to mask incoming receive doorbell interrupts from the second adapter. To initiate communication with the second adapter, I/O adapter 300 writes a "value" to a doorbell transmit port (not shown). Following which, this value is transmitted to the second adapter. Upon receipt of the value from I/O adapter 300, the second adapter, in an advantageous embodiment, "ORs" the value into it's receive doorbell register. Any resulting unmasked active bit in the second adapter's receive doorbell register will raise an interrupt to the second adapter. It should be noted that no confirmation is returned to I/O adapter 300 from the second adapter following receipt of the value.

Figure 4A:
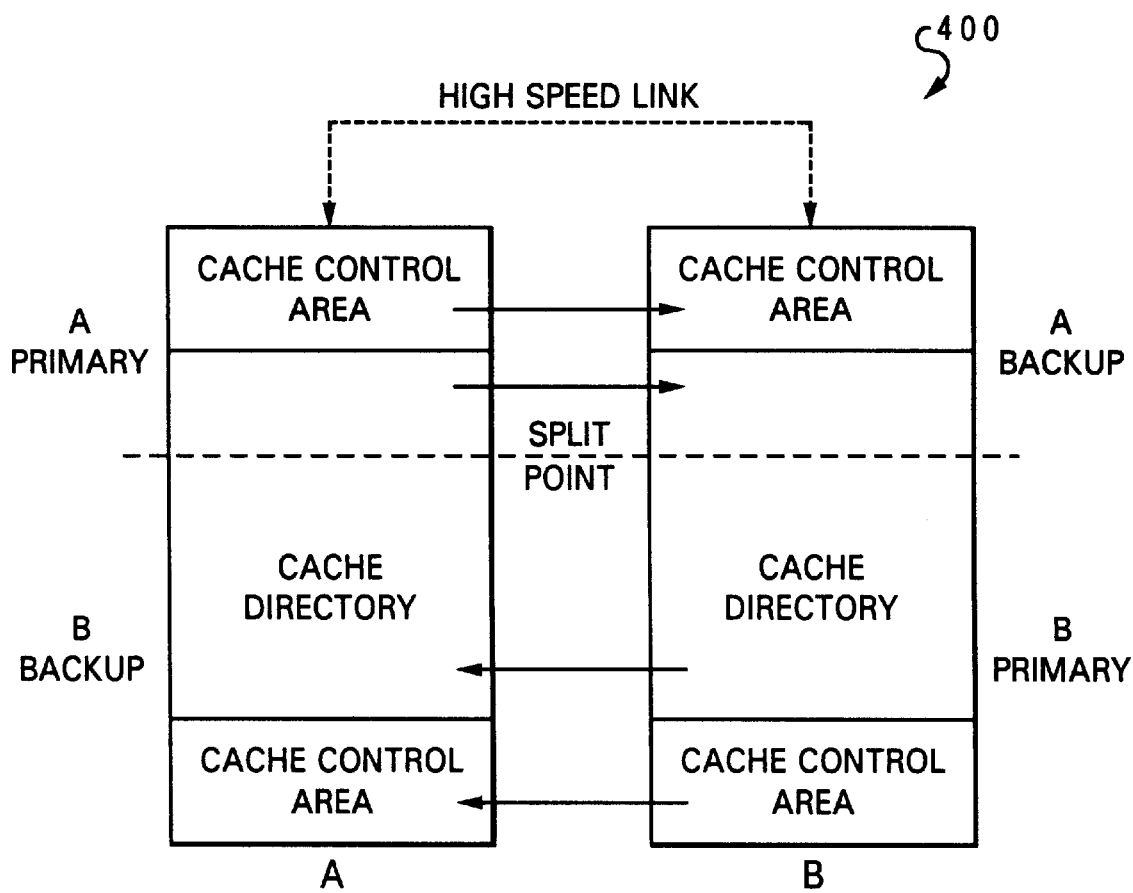
FIG. 4A illustrates an exemplary memory layout of a cache directory control area.
Figure 4B:
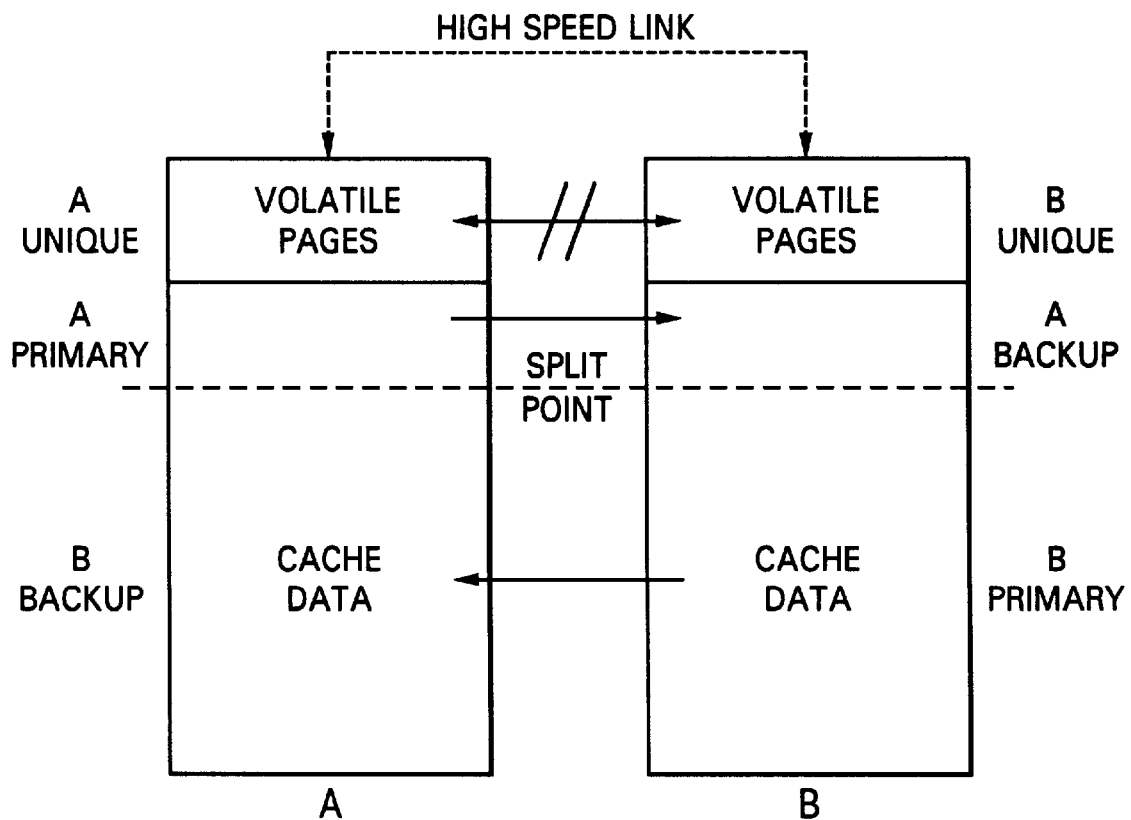
FIG. 4B illustrates an exemplary memory layout of a cache data store area.

I/O adapter 300 also includes a mirroring directory 330 that, in turn, includes a base address register 330*a*, a split point register 330*b*, an access control register 330*c*, a posted write register 330*d* and a status register 330*e*. Mirroring directory 330 is utilized to provide the ability to mirror cache directory writes in I/O adapter 300 to the second adapter and memory partitioning of cache directory 370 between the primary and backup adapter. Mirroring directory 330 also supports positive confirmation that the cache directory data has exited all temporary buffers in the "mirrored" adapter and is resident in a nonvolatile memory and ensures mirrored write ordering since all writes must be executed in the order that they were issued. Write protection of mirrored copy areas is also supported by mirroring directory 330. Base address register 330*a* defines the address location, e.g., in bulk memory, where cache directory 370 will be located. I/O adapter 300, i.e., primary adapter, will automatically mirror writes to this memory region across communication link 360 to the second adapter, i.e., backup adapter. Split point register 330*b* breaks cache directory 370 into two regions; one for cache directory data from the primary adapter and one for cache directory data from the backup adapter. Exemplary cache control area and data memory layouts in primary A and backup B adapters are illustrated in FIGS. 4A and 4B, respectively. It should be noted that the two regions in memory dedicated to cache directory data from the primary and backup adapters need not be equal in size. Access control register 330*c* is utilized to define which regions in the allocated cache directory region in memory belong to the primary adapter and to the backup adapter to enable mirroring in the primary region and to provide write protection for both regions. Posted write register 330*d* is utilized to ensure that there is adequate performance and prevent the primary adapter's processor from stalling. Status register 330*e* provides positive confirmation that the mirrored writes from the primary adapter to the backup adapter's nonvolatile memory have been committed. Status register 330*e* contains the number of writes still pending in posted write register 330*d*, the number of acknowledges from the backup adapter that is pending and the error bits for mirror write failures.

With respect to error reporting, all write operations that an adapter issues to its own cache directory will always occur. The following error conditions only blocks those write operations from being mirrored to a backup adapter. (1) Errors that occur during the execution of a mirror of cache directory 370 data to the cache directory in the second adapter utilizing communication link 360 will be reported by I/O adapter 300. The second adapter, in this case, will not report errors to its local processor. (2) Errors occurring when writing from the posted write queue in posted write register 330d will be reported utilizing status register 330e. No interrupts will be generated as a result of an error on a write from the posted write queue. (3) In the event of an error occurring on a mirror write operation to the cache directory area in the second adapter, all subsequent mirror writes to the second, or backup, adapter will be blocked by I/O adapter 300 and the second adapter. Additionally, all writes that are resident in temporary buffers and in the posted write queue will be discarded. Any writes across communication link 360 from I/O adapter 300 to the second adapter will not be allowed until I/O adapter 300 clears the error condition.

Although not shown, I/O adapter 300 also includes a direct memory access (DMA) device that can be programmed to transfer data from I/O adapter's 300 write cache to the second adapter's write cache. The DMA device is provided with starting and ending addresses for I/O adapter 300 write cache data area and the starting and ending addresses for the second adapter write cache data area. Write protection is provided by the write cache data area memory controller and only data from communication link 360 is allowed write access to the memory region reserved for the backup write cache data area, e.g., see FIG. 4B. Writes received across communication link 360 to memory locations other than those locations reserved for the second adapter are rejected. In the case of errors that occur during the execution of the DMAs to the second adapter's memory locations across communication link 360 will be reported by the adapter that issued the DMA command. The target adapter will not report errors to its local processor and these errors will not prevent the DMAs from continuing, as opposed to memory mapped I/Os (MMIOs) utilized in the cache directory. This allows I/O adapter 300 to have the ability to mirror fast write cache data to the second adapter while having write protection of the mirrored copy memory areas where the memory partitioning of write cache area within cache memory 320 is between I/O adapter 300 and the second adapter, i.e., primary and backup adapters, respectively. It should be noted that support to read the remote copy of a cache data, e.g., I/O adapter 300 cache data mirrored in the second adapter, is not required. Although certain details of I/O adapter 300 have been described and discussed in terms of its function herein above, it should be readily apparent to those skilled in the art that these functionally described mechanisms can be mapped to any suitable physical layer protocol.

While the invention has been particularly shown and described with reference to a preferred embodiment, it will be understood by those skilled in the art that various changes in form and detail may be made therein without departing from the spirit and scope of the invention.

What is claimed is:

1. An Input/Output (I/O) adapter for use with a second I/O adapter, the I/O adapter comprising:
    a dedicated communication link that provides for communication between the I/O adapter and the second I/O adapter;
    a message passing circuit, coupled to the dedicated communication link, that allows for transferring of data between the I/O adapter and the second I/O adapter;
    a doorbell circuit, coupled to the message passing circuit, that generates interrupts to provide a low level communication between the I/O adapter and the second I/O adapter; and
    a mirroring directory, coupled to the message passing circuit, that provides for the mirroring of cache directory writes.

2. The I/O adapter as recited in claim 1, wherein the transferring of data between the I/O adapter and the second I/O adapter is a write operation with no required acknowledgment from the second I/O adapter.

3. The I/O adapter as recited in claim 1, wherein the doorbell passing circuit performs a write operation from the I/O adapter to the second I/O adapter with no required acknowledgment from the second I/O adapter.

4. The I/O adapter as recited in claim 1, further comprising:
    an adapter controller;
    a cache memory; and
    a cache directory.

5. The I/O adapter as recited in claim 1, wherein the message passing circuit includes:
    a transmit buffer;
    a receive buffer;
    a transmit register that initiates the transfer of data stored in the transmit buffer to the second I/O adapter; and
    a receive register that indicates the receipt of data from the second I/O adapter.

6. The I/O adapter as recited in claim 1, wherein the doorbell circuit includes:
    a transmit doorbell register that permits the I/O adapter to set bits in the second I/O adapter's corresponding receive doorbell register;
    a receive doorbell register; and
    a mask doorbell register that allows for the masking of incoming receive doorbell interrupts.

7. The I/O adapter as recited in claim 1, wherein the mirroring directory includes:
    a base address register;
    a split point register;
    an access control register;
    a posted write register; and
    a status register.

8. The I/O adapter as recited in claim 1, wherein the dedicated communication link is a high-speed serial bus.

9. A dual storage adapter, comprising:
    a first I/O adapter;
    a second I/O adapter;
    a dedicated communication link between first and second I/O adapters that provides communication between the first and second I/O adapters; and
    wherein each of the first and second I/O adapters includes:
        a message passing circuit, coupled to the dedicated communication link, that allows for transferring of data between the first and second I/O adapters;
        a doorbell circuit, coupled to the message passing circuit, that generates interrupts to provide a low level communication between the first and second I/O adapters; and
        a mirroring directory, coupled to the message passing circuit, that provides for the mirroring of cache directory writes.

10. The dual storage adapter as recited in claim 9, wherein the transferring of data between the first I/O adapter and the second I/O adapter is a write operation with no required acknowledgment from the second I/O adapter.

11. The dual storage adapter as recited in claim 9, wherein the doorbell passing circuit performs a write operation from the first I/O adapter to the second I/O adapter with no required acknowledgment from the second I/O adapter.

12. The dual storage adapter as recited in claim 9, wherein each of the first and second I/O adapters further including:

an adapter controller;

a cache memory; and a cache directory.

13. The dual storage adapter as recited in claim 9, wherein the message passing circuit includes:

a transmit buffer;

a receive buffer;

a transmit register that initiates the transfer of data stored in the transmit buffer to the second I/O adapter; and a receive register that indicates the receipt of data from the second I/O adapter.

14. The dual storage adapter as recited in claim 9, wherein the doorbell circuit includes:

a transmit doorbell register that permits the first I/O adapter to set bits in the second I/O adapter's corresponding receive doorbell register;

a receive doorbell register; and a mask doorbell register that allows for the masking of incoming receive doorbell interrupts.

15. The dual storage adapter as recited in claim 9, wherein the mirroring directory includes:

a base address register;

a split point register;

an access control register;

a posted write register; and a status register.

16. The dual storage adapter as recited in claim 9, wherein the dedicated communication link is a high-speed serial bus.

17. A data processing system, comprising:

at least one processing unit;

at least one storage device; and a dual storage adapter that couples the processing unit to the storage device, the dual storage adapter including:

a first I/O adapter;

a second I/O adapter;

a dedicated communication link between first and second I/O adapters that provides for communication between the first and second I/O adapters; and wherein each of the first and second I/O adapters includes:

a message passing circuit, coupled to the dedicated communication link, that allows for transferring of data between the first and second I/O adapters;

a doorbell circuit, coupled to the message passing circuit, that generates interrupts to provide a low level communication between the first and second I/O adapters; and a mirroring directory, coupled to the message passing circuit, that provides for the mirroring of cache directory writes.

18. The data processing system as recited in claim 17, wherein the transferring of data between the first I/O adapter and the second I/O adapter is a write operation with no required acknowledgment from the second I/O adapter.

19. The data processing system as recited in claim 17, wherein the doorbell passing circuit performs a write operation from the first I/O adapter to the second I/O adapter with no required acknowledgment from the second I/O adapter.

20. The data processing system as recited in claim 17, wherein the message passing circuit includes:

a transmit buffer;

a receive buffer;

a transmit register that initiates the transfer of data stored in the transmit buffer to the second I/O adapter; and a receive register that indicates the receipt of data from the second I/O adapter.

21. The data processing system as recited in claim 17, wherein the doorbell circuit includes:

a transmit doorbell register that permits the first I/O adapter to set bits in the second I/O adapter's corresponding receive doorbell register;

a receive doorbell register; and a mask doorbell register that allows for the masking of incoming receive doorbell interrupts.

22. The data processing system as recited in claim 17, wherein the mirroring directory includes:

a base address register;

a split point register;

an access control register;

a posted write register; and a status register.

23. The data processing system as recited in claim 17, wherein the dedicated communication link is a high-speed serial bus.

24. The data processing system as recited in claim 17, wherein the storage device is a switchable direct access storage device (DASD).

\* \* \* \* \*